United States Patent
Kim et al.

(10) Patent No.: US 10,958,611 B2
(45) Date of Patent: Mar. 23, 2021

(54) METHOD AND SYSTEM FOR PROVIDING MESSAGE-BASED NOTIFICATION

(71) Applicant: LINE Corporation, Tokyo (JP)

(72) Inventors: Julie Kim, Seongnam-si (KR); Seonggu Huh, Seongnam-si (KR)

(73) Assignee: LINE CORPORATION, Tokyo (JP)

(*) Notice: Subject to any disclaimer, the term of this patent is extended or adjusted under 35 U.S.C. 154(b) by 25 days.

(21) Appl. No.: 16/313,580

(22) PCT Filed: Aug. 8, 2016

(86) PCT No.: PCT/KR2016/008709
§ 371 (c)(1),
(2) Date: Dec. 27, 2018

(87) PCT Pub. No.: WO2018/030554
PCT Pub. Date: Feb. 15, 2018

(65) Prior Publication Data
US 2019/0268298 A1 Aug. 29, 2019

(51) Int. Cl.
*H04L 12/00* (2006.01)
*H04L 12/58* (2006.01)
*G06Q 50/30* (2012.01)

(52) U.S. Cl.
CPC ............ *H04L 51/24* (2013.01); *G06Q 50/30* (2013.01); *H04L 51/043* (2013.01); *H04L 51/16* (2013.01); *H04L 51/26* (2013.01); *H04L 51/30* (2013.01)

(58) Field of Classification Search
CPC ....... H04L 51/18; H04L 51/043; H04L 51/16; H04L 51/30; H04L 51/24; H04L 51/046; H04L 51/26; G06Q 50/30
(Continued)

(56) References Cited

U.S. PATENT DOCUMENTS 6,560,318 B1* 5/2003 Spielman ............ H04M 3/5307
379/67.1
7,088,993 B2* 8/2006 Dumont .................. H04W 4/14
455/412.1
(Continued)

FOREIGN PATENT DOCUMENTS

CN 102404127 A 4/2012
JP 2016-35750 A 3/2016
(Continued)

OTHER PUBLICATIONS

International Search Report PCT/ISA/210 fpr PCT International Application No. PCT/KR2016/008709 dated May 2, 2017.
(Continued)

*Primary Examiner* — Frantz Coby
(74) *Attorney, Agent, or Firm* — Harness, Dickey & Pierce, P.L.C.

(57) ABSTRACT

A method and a system for providing message based-notification, and a method for providing message based-notification comprises: setting, as a primary notification object, a main object associated with a user of an electronic device among notification objects on a messenger installed in the electronic device; detecting the primary notification object by using a message transmitted or received through a conversation session set between an account of the user of the electronic device and an account of another user; and when the primary notification object is detected, controlling a server to generate a notification message for the corresponding notification object and transmit the notification message to the account of the user of the electronic device.

15 Claims, 12 Drawing Sheets

(58) Field of Classification Search
USPC .......................................... 709/206, 204, 207
See application file for complete search history.

(56) References Cited

U.S. PATENT DOCUMENTS

| | | | | |
|---|---|---|---|---|
| 7,739,345 | B2* | 6/2010 | Heinzel | G06Q 10/107 |
| | | | | 709/203 |
| 8,554,855 | B1* | 10/2013 | Lowry | H04L 67/26 |
| | | | | 709/206 |
| 8,630,624 | B2* | 1/2014 | Marcellino | H04W 36/385 |
| | | | | 455/412.1 |
| 8,719,238 | B2* | 5/2014 | Horn | G06Q 10/107 |
| | | | | 707/694 |
| 8,761,737 | B2* | 6/2014 | Clarke | H04L 51/34 |
| | | | | 455/414.1 |
| 9,628,950 | B1* | 4/2017 | Noeth | H04M 1/72552 |
| 9,699,625 | B2* | 7/2017 | Kaplinger | H04L 69/08 |
| 2005/0053221 | A1* | 3/2005 | Reding | H04M 3/53 |
| | | | | 379/211.02 |
| 2008/0090659 | A1* | 4/2008 | Aguilar | A63F 13/85 |
| | | | | 463/42 |
| 2008/0107057 | A1* | 5/2008 | Kannan | H04W 68/005 |
| | | | | 370/312 |
| 2010/0114686 | A1* | 5/2010 | Carlson | G06Q 30/0222 |
| | | | | 705/14.17 |
| 2011/0125852 | A1 | 5/2011 | Wolfe | |
| 2011/0179121 | A1* | 7/2011 | Chan | H04L 51/36 |
| | | | | 709/206 |
| 2012/0303774 | A1* | 11/2012 | Wilson | H04L 51/14 |
| | | | | 709/223 |
| 2013/0060871 | A1 | 3/2013 | Downes et al. | |
| 2013/0260893 | A1 | 10/2013 | Shin et al. | |
| 2013/0332543 | A1 | 12/2013 | Shin et al. | |
| 2014/0019540 | A1 | 1/2014 | Shin et al. | |
| 2015/0019654 | A1* | 1/2015 | Wheeler | H04L 51/24 |
| | | | | 709/206 |
| 2015/0019662 | A1* | 1/2015 | O'Kane | G06Q 10/107 |
| | | | | 709/206 |
| 2016/0142546 | A1 | 5/2016 | Khanna | |
| 2017/0099592 | A1* | 4/2017 | Loeb | G06Q 10/107 |

FOREIGN PATENT DOCUMENTS

| | | |
|---|---|---|
| KR | 10-2002-0074304 A | 9/2002 |
| KR | PCT/KR/2014/010167 B1 | 7/2015 |
| KR | 10-1590418 B1 | 2/2016 |
| KR | 10-2016-0061250 A | 5/2016 |

OTHER PUBLICATIONS

Japanese Office Action dated Jul. 21, 2020 for corresponding Japanese Application No. 2019-502224.
Chinese Office Action dated Dec. 18, 2020 for corresponding Chinese Patent Application No. 201680087400.8.

* cited by examiner

METHOD AND SYSTEM FOR PROVIDING MESSAGE-BASED NOTIFICATION

CROSS REFERENCE TO RELATED APPLICATION(S)

This is a National Stage Application under 35 U.S.C. § 371 of International Application No. PCT/KR2016/008709, filed Aug. 8, 2016, the entire contents of which are hereby incorporated herein by reference.

TECHNICAL FIELD

The following description of one or more example embodiments relates to technology for providing a notification on a messenger.

RELATED ART

A messenger that is a general communication tool refers to software that may transmit or receive messages or data in real time. A user may register a conversation buddy to the messenger and may exchange messages with another party registered to a conversation buddy list in real time.

Such a messenger function is common in a mobile environment of a mobile communication terminal as well as a personal computer (PC). For example, Korean Patent Laid-Open Publication NO. 10-2002-0074304 discloses a service system and method for mobile messenger of mobile phone using wireless communication network to provide a messenger service between mobile messengers installed on portable terminals.

Reference materials may include <PCT/KR/2014/010167, US20140019540A1, US20130332543A1, US20130260893>

DETAILED DESCRIPTION

Subject

One or more example embodiments provide a method and system that may provide a notification regarding items related to a user on a messenger.

One or more example embodiments provide a method and system that may provide a notification, prioritized based on an importance, based on a message.

Solution

According to an aspect of at least one example embodiment, there is provided a message-based notification method of a computer-implemented server, the method including setting, as a primary notification object, a main object associated with a user of an electronic device among notification objects on a messenger installed on the electronic device; detecting the primary notification object using a message transmitted or received through a conversation session set between an account of the user of the electronic device and an account of another user; and in response to detecting the primary notification object, generating a notification message for the corresponding notification object and controlling the server to transmit the notification message to the account of the user of the electronic device.

According to an aspect of at least one example embodiment, there is provided a message-based communication system of a computer-implemented server, the system including at least one processor configured to executable computer-readable instructions. The at least one processor is configured to set, as a primary notification object, a main object associated with a user of an electronic device among notification objects on a messenger installed on the electronic device, detect the primary notification object using a message transmitted or received through a conversation session set between an account of the user of the electronic device and an account of another user, generate a notification message that includes information on the conversation session in which the primary notification object is detected and contents of the corresponding notification object, and control the server to transmit the notification message to the account of the user of the electronic device through a conversation session set alone in the account of the user of the electronic device for the primary notification object.

According to an aspect of at least one example embodiment, there is provided a computer-program stored in a non-transitory computer-readable recording medium to implement a message-based notification method in conjunction with a computer-implemented electronic device. The message-based notification method includes, with respect to a primary notification object set as a main object associated with a user of the electronic device among notification objects on a messenger installed on the electronic device, controlling the electronic device to receive a notification message for the primary notification object from a server associated with the messenger through a conversation session set alone in an account of the user of the electronic device; and controlling the electronic device to display the notification message on a screen of the electronic device through a chatroom corresponding to the conversation session.

Effect

According to some example embodiments, it is possible to distinguishably notify items that are to be recognized by a user on a messenger on which various notifications occur. Here, a separate messenger interface not integrated with a notification center or a device push system within a service may be used as a method of delivering a notification based on a service characteristic of the messenger.

According to some example embodiments, instead of simply delivering a notification regarding an item related to a user on a messenger, a path redirectable to the corresponding item is provided after verifying contents of the notification. Thus, the user may easily verify the corresponding item with a minimum number of motions and may immediately take a subsequent action.

Accordingly, it is possible to enhance communication efficiency and convenience on the messenger through which a large number of notifications are delivered.

BEST MODE

Hereinafter, example embodiments are described with reference to the accompanying drawings.

Figure 1:
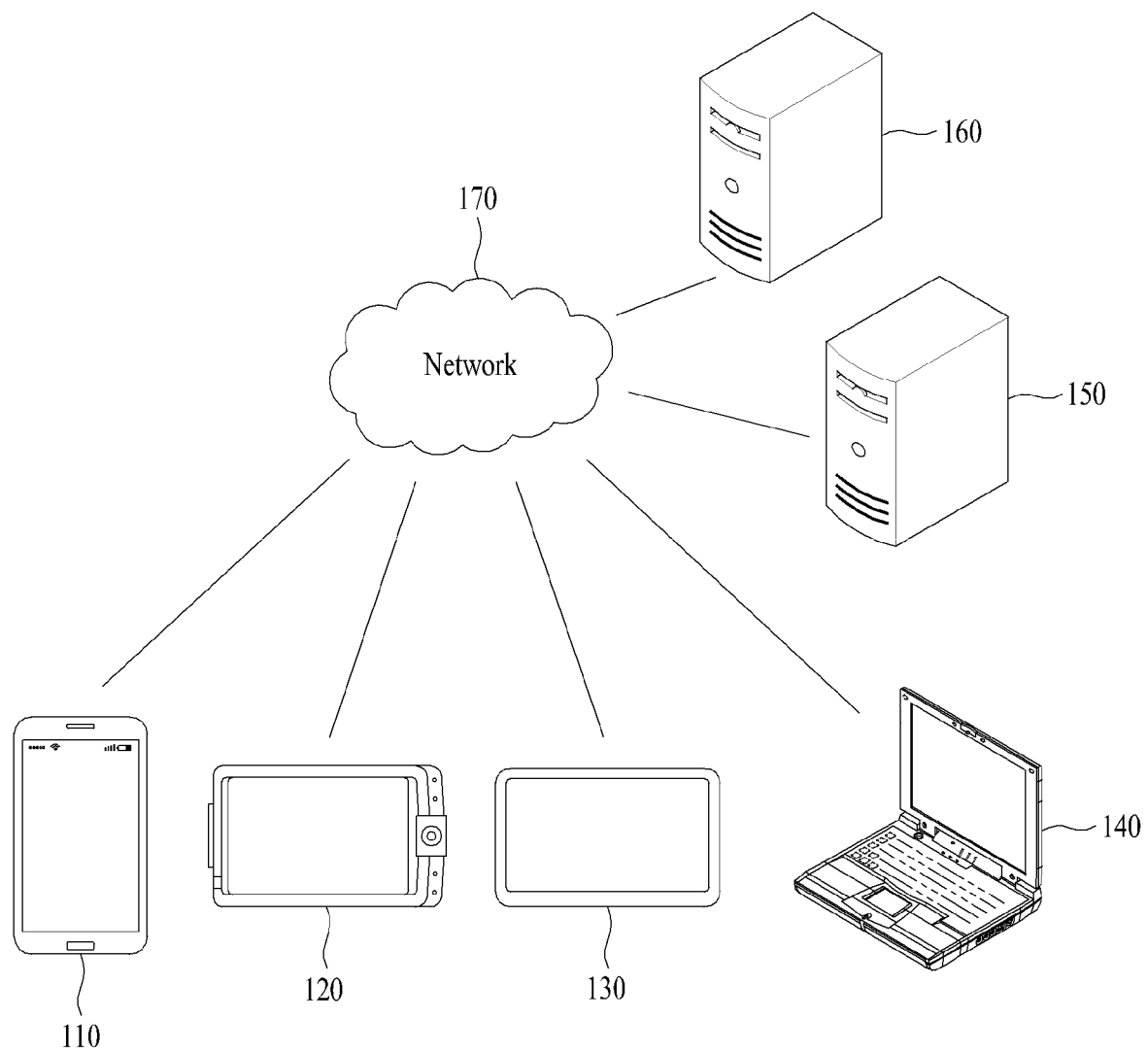
FIG. 1 is a diagram illustrating an example of a network environment according to at least one example embodiment.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, a number of electronic devices and/or a number of servers are not limited thereto.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, a navigation, a computer, a laptop computer, a digital broadcasting terminal, a personal digital assistant (PDA), a portable multimedia player (PMP), a tablet personal computer (PC), and the like. For example, the electronic device 110 may communicate with other electronic devices 120, 130, and 140 and/or servers 150 and 160 over the network 170 using a wireless or wired communication scheme.

The communication scheme is not particularly limited and may include a communication method that uses a near field communication between devices as well as a communication method using a communication network, for example, a mobile communication network, the wired Internet, the wireless Internet, a broadcasting network, etc., which may be included in the network 170. For example, the network 170 may include at least one of networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and 140 over the network 170. For example, the electronic device 110 may access the server through an application installed on the electronic device 110 and may use a preset service, for example, a messaging service, a social network service (SNS), a game service, a financial service, and the like. For example, the server 150 may set a communication session for the messaging service and may route message transmission and reception between the plurality of electronic devices 110, 120, 130, and 140 through the set communication session.

In detail, the server 150 may provide a communication function for a message-based notification method according to example embodiments, and thereby recognize an item related to a user of the electronic device 110 and provide a message-based notification for the corresponding item.

Figure 2:
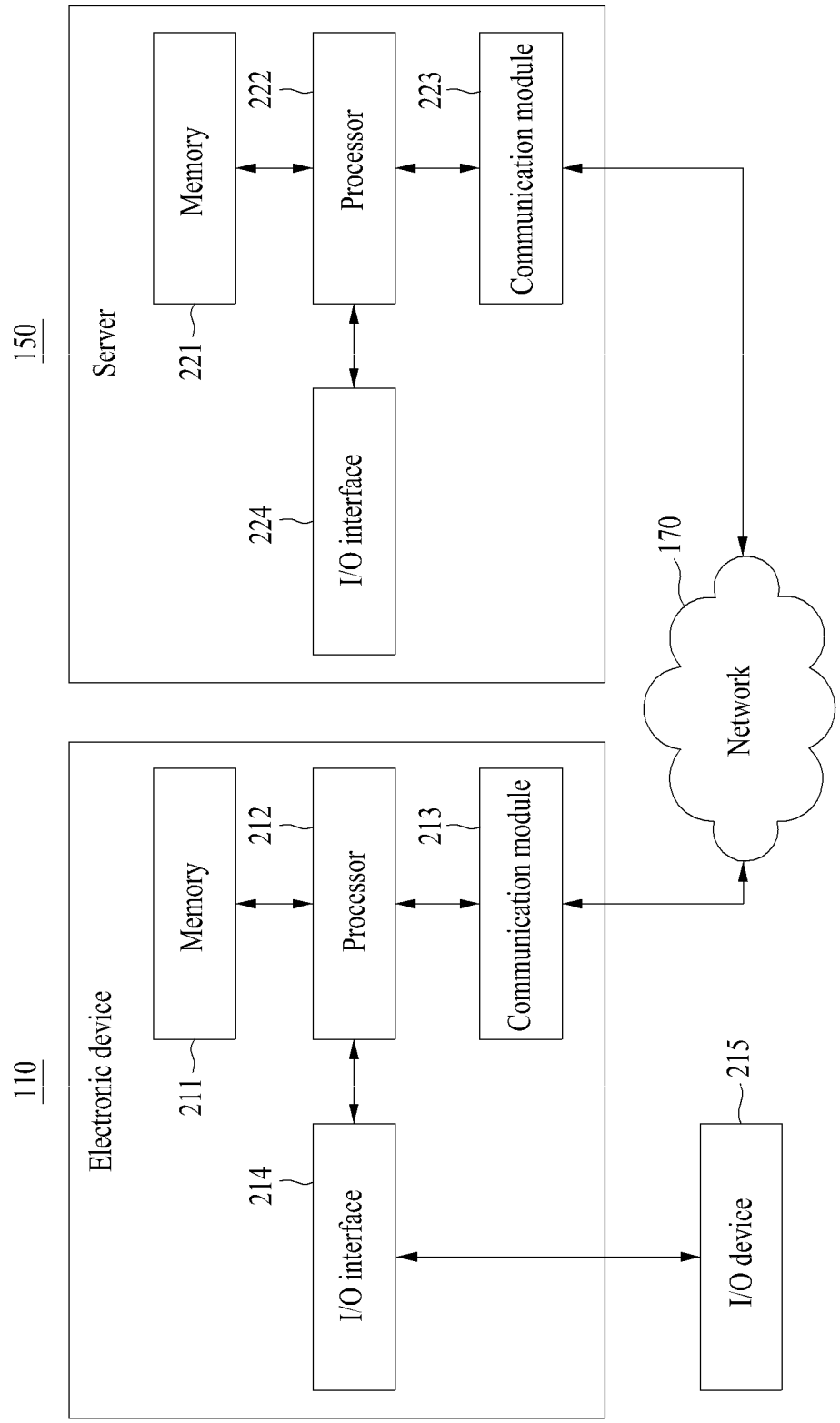
FIG. 2 is a block diagram illustrating a configuration of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The same or similar components may be applicable to other electronic devices 120, 130, and 140, or the server 160, and also to still other electronic devices or still other servers.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), read only memory (ROM), and a disk drive, as a non-transitory computer-readable storage medium. Also, an OS or at least one program code, for example, a code for an application for providing a specific service or a browser installed and executed on the electronic device 110, may be stored in the memory 211, 221. Such software components may be loaded from another non-transitory computer-readable storage medium separate from the memory 211, 221 using a drive mechanism. The other non-transitory computer-readable storage medium may include, for example, a floppy drive, a disk, a tape, a DVD/CD-ROM drive, a memory card, etc. According to other example embodiments, software components may be loaded to the memory 211, 221 through the communication module 213, 223, instead of the non-transitory computer-readable storage medium. For example, at least one program may be loaded to the memory 211, 221 based on a program, for example, the application, installed by files provided over the network 170 from developers or a file distribution system, for example, the server 160, which provides an installation file of the application.

The processor 212, 222 may be configured to process computer-readable instructions of a computer program by performing basic arithmetic operations, logic operations, and I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 222.

The communication module 213, 223 may provide a function for communication between the electronic device 110 and the server 150 over the network 170, and may provide a function for communication between the electronic device 110 or the server 150 and another electronic device, for example, the electronic device 120 or another server, for example, the server 160. For example, the processor 212 of the electronic device 110 may transfer a request created based on a program code stored in the storage device, such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the permanent storage device, further includable in the electronic device 110.

The I/O interface 214, 224 may be a device used for interface with an I/O device 215. For example, an input device may include a device, such as a keyboard, a mouse, etc., and an output device may include a device, such as a display for displaying a communication session of an application. As another example, the I/O interface 214 may be a device, such as a touchscreen, for interface with an apparatus in which a function for an input and a function for an output are integrated into a single function. In detail, when processing instructions of the computer program loaded to the memory 211, the processor 212 of the electronic device 110 may display a service screen configured using data provided from the server 150 or the electronic device 120, or may display content on a display through the I/O interface 214.

According to other example embodiments, the electronic device 110 and the server 150 may include a greater or lesser number of components than a number of components shown in FIG. 2. However, there is no need to clearly illustrate many components according to the related art. For example, the electronic device 110 may include at least a portion of the I/O device 215, or may further include other components, for example, a transceiver, a global positioning system (GPS) module, a camera, a variety of sensors, a database, and the like. In detail, if the electronic device 110 is a smartphone, the electronic device 110 may be configured to further include a variety of components, for example, an accelerometer sensor, a gyro sensor, a camera, various physical buttons, a button using a touch panel, an I/O port, a vibrator for vibration, etc., which are generally included in the smartphone.

The example embodiments relate to technology for providing a notification on a social network messenger.

Example embodiment including details disclosed herein may deliver a message-based notification on a messenger and may achieve many advantages in terms of efficiency, convenience, and cost saving.

In a current social network service (SNS), all the modifications associated with a user are integrated in a device push service or a notification center within a service and are delivered in a single notification form regardless of a type or importance of corresponding modification.

A communication function provided from each service may uniformly deliver modifications that are to be notified, regardless of importance between the modifications. Thus, a notification that is to be recognized by the user to take a subsequent action is not distinguished from other general notifications, which may lead to causing communication inefficiency.

According to the example embodiments, it is possible to distinguish modifications that are to be recognized by a user on a social network messenger on which a plurality of notifications occurs, and to deliver a notification for a corresponding item using a separate method. Also, instead of simply delivering a notification of a modification, a function capable of immediately redirecting to the corresponding modification after verifying the modification is assigned. Thus, it is possible to support the user to immediately verify important modifications with a relatively small number of motions. Through this, it is possible to outperform a communication inefficiency issue occurring in the social network messenger through which a large number of notifications are delivered.

Figure 3:
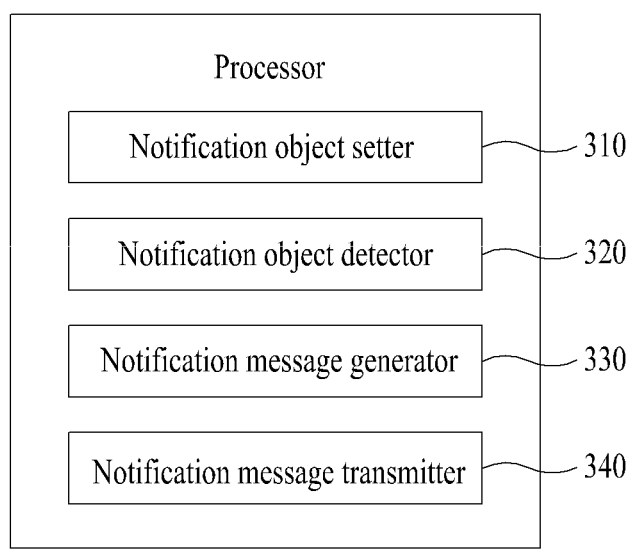
FIG. 3 is a block diagram illustrating an example of components includable in a processor of a server according to at least one example embodiment.
Figure 4:
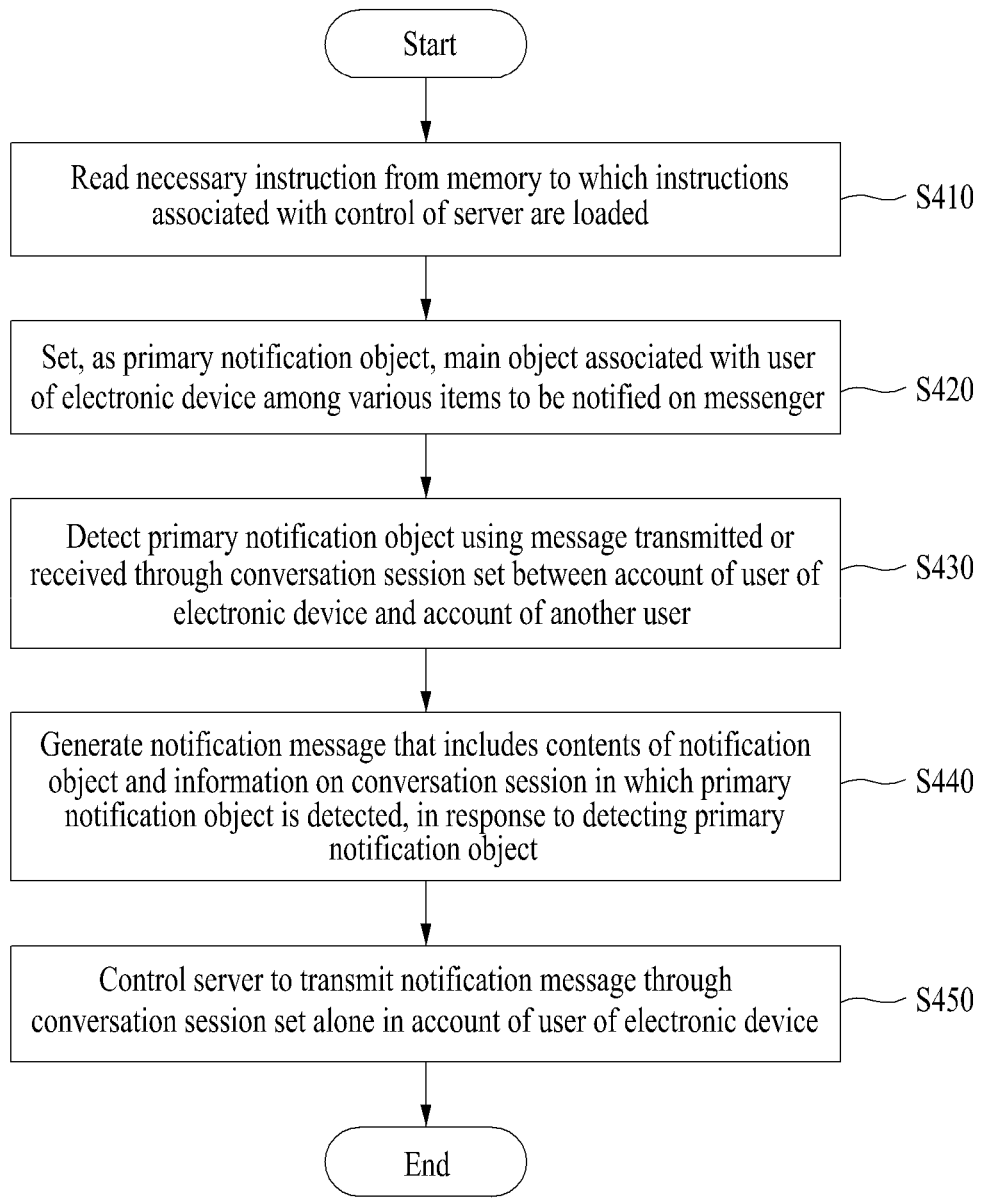
FIG. 4 is a flowchart illustrating an example of a method performed by a server according to at least one example embodiment.

FIG. 3 is a block diagram illustrating an example of components includable in a processor of a server according to at least one example embodiment, and FIG. 4 is a flowchart illustrating an example of a method performed by a server according to at least one example embodiment.

The server 150 according to the example embodiment may be configured as a computer-implemented message-based notification system, and the message-based notification system configured in the server 150 may perform a message-based notification method of FIG. 4. To perform the message-based notification method of FIG. 4, referring to FIG. 3, the processor 222 of the server 150 may include a notification object setter 310, a notification object detector 320, a notification message generator 330, and a notification message transmitter 340 as components. Depending on example embodiments, the components of the processor 222 may be selectively included in or excluded from the processor 222. Also, depending on example embodiments, the components of the processor 222 may be separate or merged for functional representation of the processor 222.

The processor 222 and the components of the processor 222 may control the server 150 to perform operations S410 through S450 included in the message-based notification method of FIG. 4. For example, the processor 222 and the components of the processor 222 may be configured to execute an instruction according to a code of at least one program or a code of the OS included in the memory 221.

Here, the components of the processor 222 may be representations of different functions of the processor 222 that are performed by the processor 222 in response to an instruction, for example, an instruction provided from a program executed on the server 150, provided from a program code stored in the server 150. For example, the notification message transmitter 340 may be used as a functional representation of the processor 222 that controls the server 150 to deliver the notification message in response to the instruction.

Referring to FIG. 4, in operation S410, the processor 222 may read a necessary instruction from the memory 221 to which instructions associated with control of the server 150 are loaded. In this case, the read instruction may include an instruction to control the processor 222 to perform the following operations S420 through S450.

In operation S420, the notification object setter 310 may set, as a primary notification object, a main object associated with a user of the electronic device 110 among various items to be notified on a messenger. The primary notification object may be selected or received from the user of the electronic device 110 on which the messenger is installed. In addition, the primary notification object may be set as a default or may be determined based on a system logic, for example, an object that is frequently set by other users. That is, the primary notification object may be commonly set to all of the electronic devices using the messenger, or may be set to be different for a user of each electronic device or based on a system setting. For example, the notification object setter 310 may set a new group chat as the primary notification object, which is to deliver a notification for the new group chat to the user when a new group chatroom including the user is generated by another user, for example, a user of the electronic device 120. As another example, the notification object setter 310 may set a keyword (hereinafter, referred to as a user designation word) designating the user as the primary notification object, which is to deliver a notification for a user designation chat to the user when a chat including the user designation word is generated by another user. As another example, the notification object setter 310 may set, as the primary notification object, a specific keyword (hereinafter, referred to as a "word of interest of the user") to which interest and intent of the user is reflected, which is to deliver a notification for a chat of interest of the user to the user when a chat including the word of interest of the user is generated by another user. The primary notification object may be distinguished as an item that is to be recognized by the user to take a subsequent action. Without being limited thereto, the primary notification object may be modified and/or expanded if they may occur on the messenger.

In operation S430, the notification object detector 320 may detect the primary notification object using a message transmitted or received through a conversation session set between an account of the user of the electronic device 110 and an account of at least one another user. The notification object detector 320 may search for a real-time conversation on the messenger and may detect a notification object to be delivered to the user. For example, the notification object detector 320 may detect a new group chat including the user of the electronic device 110. That is, when a group chatroom including the user is newly generated or the user is invited to a group chatroom in which other users participate, the notification object detector 320 may detect the event as an object to be notified of the user. As another example, the notification object detector 320 may search for a message transmitted or received through the conversation session set between the account of the user and the account of the at least one other user, and may detect a chat including a user designation word. As another example, the notification object detector 320 may search for a message transmitted or received through the conversation session set between the account of the user and the account of the at least one other user, and may detect a chat including a word of interest of the user.

In operation S440, in response to detecting the primary notification object, the notification message generator 330 may generate a notification message that includes contents of the notification object and information on the conversation session in which the primary notification object is detected. The notification message generator 330 may generate a message that includes contents of an item corresponding to the notification object and a link immediately redirectable to a chatroom associated with the item, with respect to the notification object corresponding to the primary notification object. That is, a communication function for main items that are to be recognized by the user may include the link immediately redirectable to the chatroom in which the corresponding item occurs.

In operation S450, the notification message transmitter 340 may control the server 150 to transmit a notification message for the primary notification object through a conversation session set alone in the account of the user of the electronic device 110. The notification message transmitted in operation S450 may be received at the electronic device 110 and may be displayed on a separate chatroom on the messenger installed on the electronic device 110, that is, a chatroom (hereinafter, referred to as a personal private chatroom) corresponding to the conversation session set alone in the account of the user. Accordingly, the server 150 may use the personal private chatroom as a notification delivery method for the primary notification object among a plurality of notifications occurring on the messenger.

Figure 5:
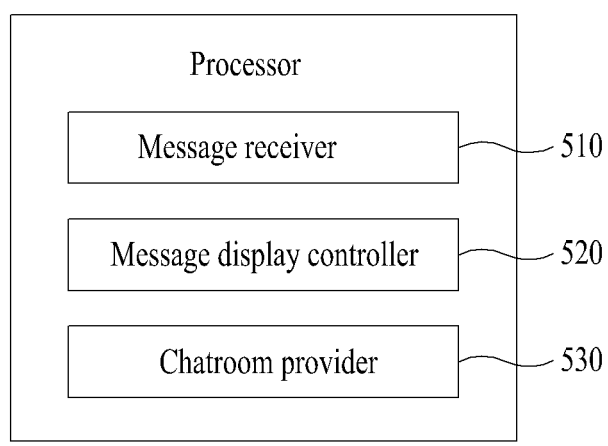
FIG. 5 is a block diagram illustrating an example of components includable in a processor of an electronic device according to at least one example embodiment.
Figure 6:
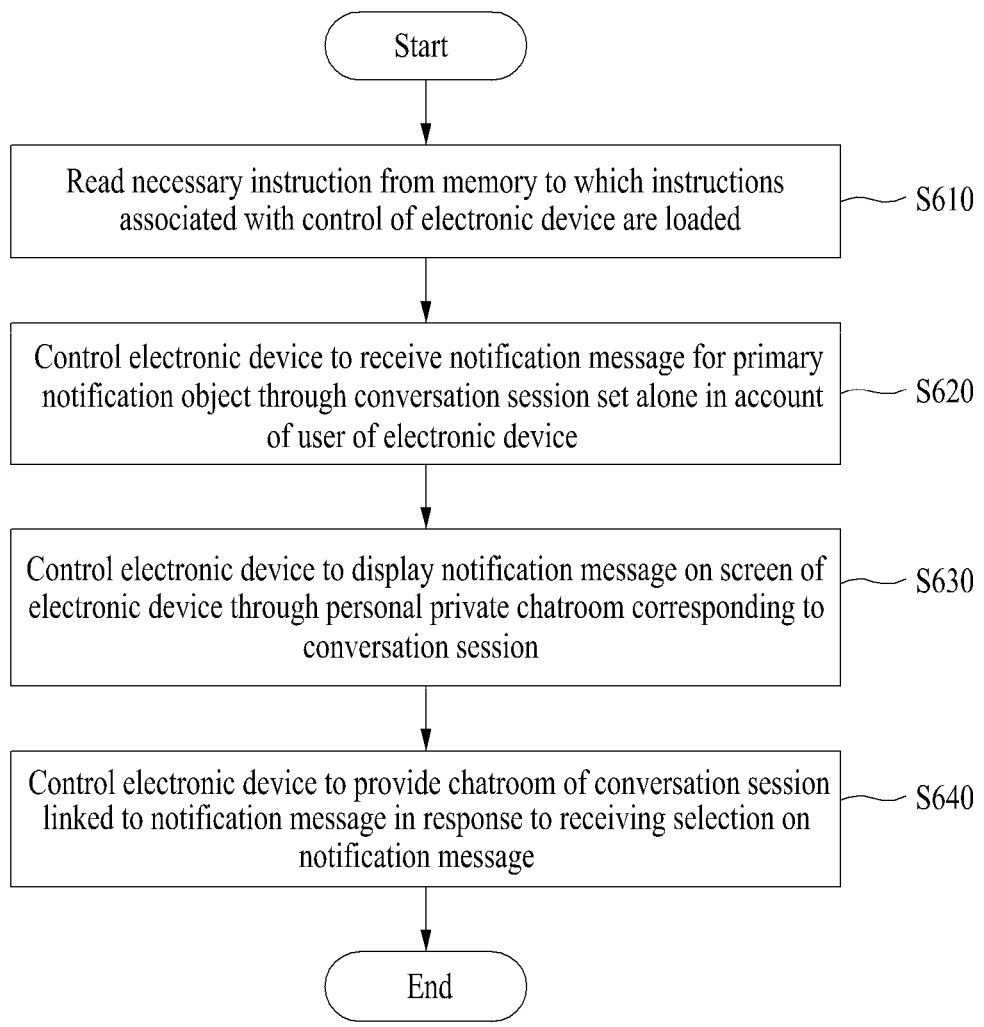
FIG. 6 is a flowchart illustrating an example of a method performed by an electronic device according to at least one example embodiment.

FIG. 5 is a block diagram illustrating an example of components includable in a processor of an electronic device according to at least one example embodiment, and FIG. 6 is a flowchart illustrating an example of a method performed by an electronic device according to at least one example embodiment A computer-implemented message-based notification system may be configured on the electronic device 110 according to the example embodiment. For example, in response to an instruction provided from a messenger application installed on the electronic device 110, the message-based notification system configured on the electronic device 110 may perform the message-based notification method. To perform the message-based notification method of FIG. 6, referring to FIG. 5, the processor 212 of the electronic device 110 may include a message receiver 510, a message display controller 520, and a chatroom provider 530 as components. Depending on example embodiments, the components of the processor 212 may be selectively included in or excluded from the processor 212. Also, depending on example embodiments, the components of the processor 212 may be separate or merged for functional representation of the processor 212.

The processor 212 and the components of the processor 212 may control the electronic device 110 to perform operations S610 through S640 included in the message-based notification method of FIG. 6. For example, the processor 212 and the components of the processor 212 may be configured to execute an instruction according to a code of at least one program or a code of the OS included in the memory 211.

Here, the components of the processor 212 may be representations of different functions of the processor 212 that are performed by the processor 212 in response to an instruction, for example, an instruction provided from a messenger application executed on the electronic device 110, provided from a program code stored in the electronic device 110. For example, the message display controller 520 may be used as a functional representation of the processor 212 that controls the electronic device 110 to display the message on the screen in response to the instruction.

Referring to FIG. 6, in operation S610, the processor 212 may read a necessary instruction from the memory 211 to which instructions associated with control of the electronic device 110 are loaded. In this case, the read instruction may include an instruction to control the processor 212 to perform the following operations S620 through S640.

In operation S620, the message receiver 510 may control the electronic device 110 to receive, from the server 150, a notification message for a primary notification object through a conversation session set alone in an account of the user of the electronic device 110. For example, the notification message transmitted in operation S450 of FIG. 4 may be received at the electronic device 110 in operation S620. As described above, the notification message may be transmitted from the server 150 to the electronic device 110 through the conversation session set alone in the account of the user of the electronic device 110, and may include contents of a notification object corresponding to the primary notification object and link information associated with the conversation session in which the primary notification object is detected.

In operation S630, the message display controller 520 may control the electronic device 110 to display, on the screen of the electronic device 110, the notification message that is received in operation S620 through a personal private chatroom corresponding to the conversation session set alone in the account of the user of the electronic device 110. The personal private chatroom may be, for example, a messenger interface separate from a general chatroom for exchanging a conversation with another user, for example, the electronic device 120. That is, the personal private chatroom may refer to an exclusive private chatroom in which only the server 150 may transmit a message aside from the user of the electronic device 110 and only the user of the electronic device 110 may view the message. For example, the personal private chatroom may be configured to be distinguished from a general chatroom on the messenger and to be accessible through a separate icon or a profile of a corresponding user in a conversation list. That is, in response to receiving the notification message for the primary notification object from the server 150, the message display controller 520, the received notification message may be displayed on the personal private chatroom to be viewed only by the user of the electronic device 110.

In operation S640, in response to receiving a selection on the notification message displayed on the personal private chatroom by the user of the electronic device 110, the chatroom provider 530 may control the electronic device 110 to provide a chatroom corresponding to the conversation session linked to the notification message. The user of the electronic device 110 may verify contents of the notification object from the notification message displayed on the personal private chatroom, and may select a link included in the notification message and may immediately redirect to a general chatroom corresponding to a corresponding notification and may take a subsequent action in the corresponding chatroom.

FIGS. 7 through 12 illustrate examples of a user scenario for a primary notification object.

Figure 7:
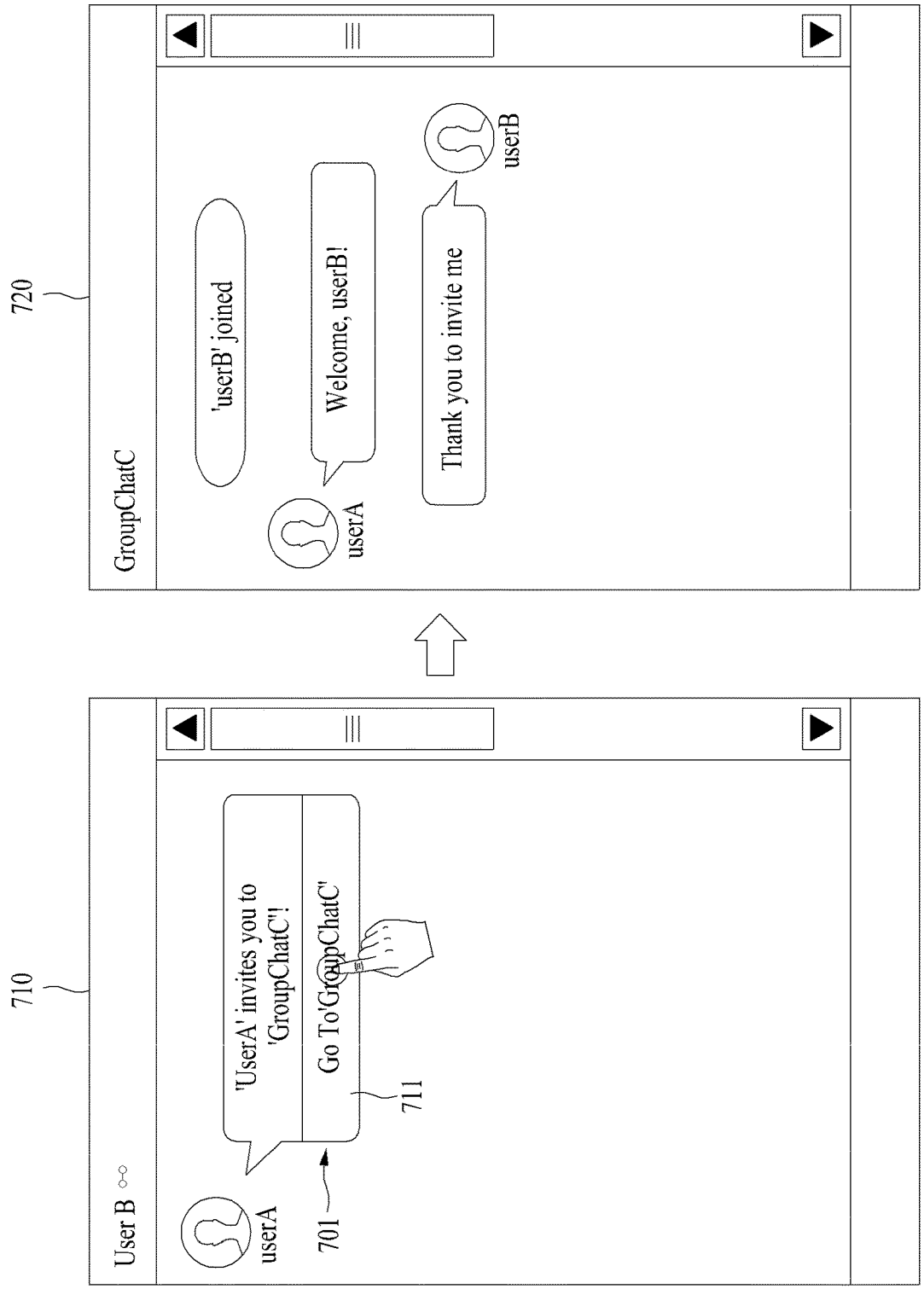
FIG. 7 illustrates an example of describing a notification for a new group chat as a message-based notification according to at least one example embodiment.

FIG. 7 illustrates an example of describing a notification for a new group chat.

In response to newly generating a group chatroom including the user of the electronic device 110 or inviting the user to a group chatroom in which other users participate, the server 150 may deliver a notification for a new group chat to a personal private chatroom of the user.

For example, when a user A invites a user B to a group chat, the server 150 delivers a notification message for a new group chat to a personal private chatroom of the user B with respect to an invitation request from the user A.

Referring to FIG. 7, a notification message 701 for a new group chat is displayed on a personal private chatroom 710 of the user B, and the notification message 701 includes a connection link 711 immediately redirectable to the new group chatroom to which the user A invites the user B with notification contents, for example, "'UserA' invites you to 'GroupChatC'".

The user B may verify contents of the notification message 701 through the personal private chatroom 710 without verifying an existing notification and may immediately redirect to a chatroom C 720 to which the user A invites the user B through the connection link 711 delivered with the notification message 701 and may join the new group chat.

Figure 8:
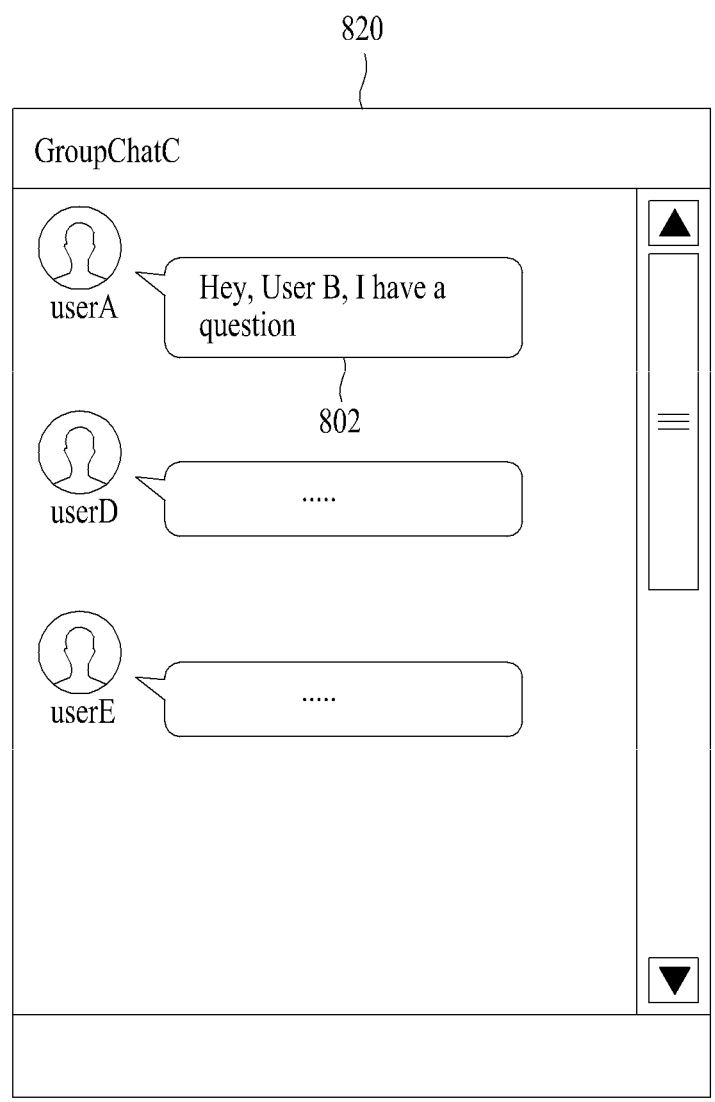
FIGS. 8 through 10 illustrate examples of describing a notification for a user designation chat as a message-based notification according to at least one example embodiment.
Figure 9:
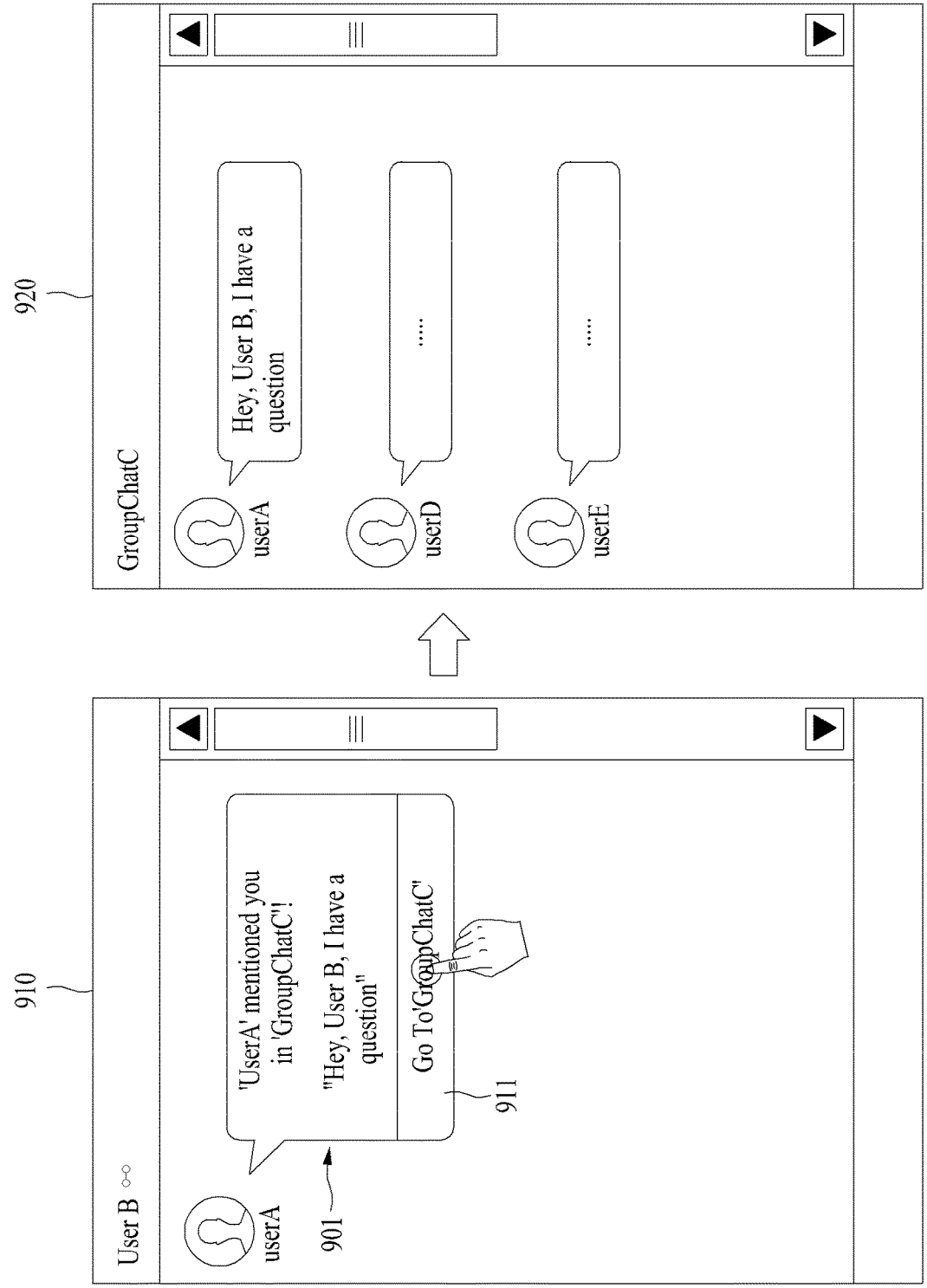
Figure 10:
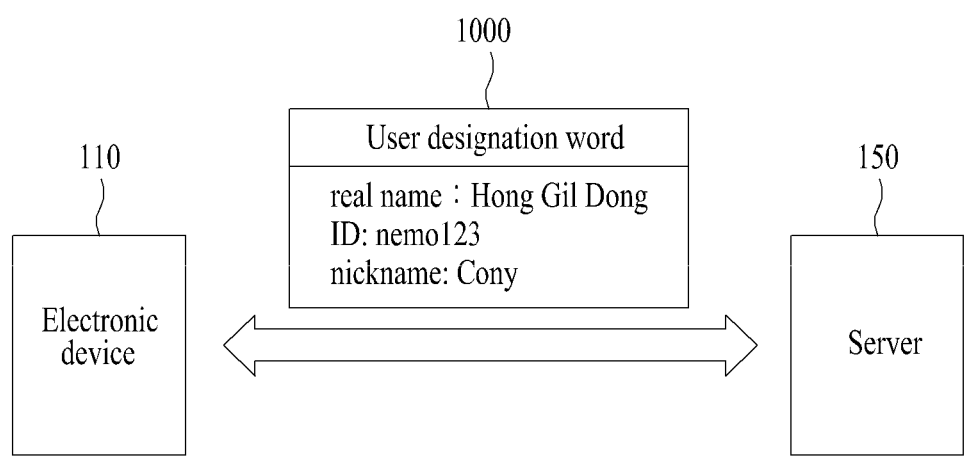

FIGS. 8 through 10 illustrate examples of describing a notification for a user designation chat.

In response to an occurrence of a chat that designates the user of the electronic device 110 during a conversation on a messenger, the server 150 may deliver a notification for the user designation chat to a personal private chatroom of the corresponding user.

Referring to FIG. 8, during a conversation in a chatroom C 820, a user A may designate a user B and transmit a message 802 to the user B. In this case, the server 150 may identify the message 802 in which the user B is designated and may deliver a notification message for the user designation chat to a personal private chatroom of the user B.

Referring to FIG. 9, a notification message 901 for a user designation chat is displayed on a personal private chatroom 910 of a user B and the notification message 901 includes notification contents, for example, "'UserA' mentioned you in 'GroupChatC'!" and a connection link 911 immediately redirectable to a chatroom mentioned by the user B.

The user B may verify contents of the notification message 901 through the personal private chatroom 910 without verifying an existing notification and may immediately redirect to a chatroom C 920 through the connection link 911 delivered with the notification message 901 and may take a subsequent action, for example, an action of delivering a response message.

Designating a user indicates that a designation word associated with the user of the electronic device 110 is included in a conversation. Referring to FIG. 10, at least one user designation word 1000 may be stored on the electronic device 110 and/or the server 150 with respect to the user of the electronic device 110 on which a messenger is installed. The user designation word 1000 associated with the user of the electronic device 110 may include a real name, a unique ID, and a nickname, for example, a nick name, a display name, and an edit name, of the user of the electronic device 110 stored on the server 150. Additionally, the user designation word 1000 associated with the user of the electronic device 110 may further include a nickname stored on a client. For example, the user designation word 1000 may include a nickname of the user that is directly set by the user on the messenger of the electronic device 110, a nickname that is set by another user on a messenger of the other user, for example, a user of the electronic device 120 or the electronic device 130 and designates the user of the electronic device 110. The user designation word 1000 may be stored in the server 150 and may synchronize with all the electronic devices using the messenger.

The server 150 may detect a chat in which a specific user is designated during a conversation exchanged between users. In this case, the server 150 may deliver a notification for a user designation chat to a personal private chatroom of the corresponding user.

Figure 11:
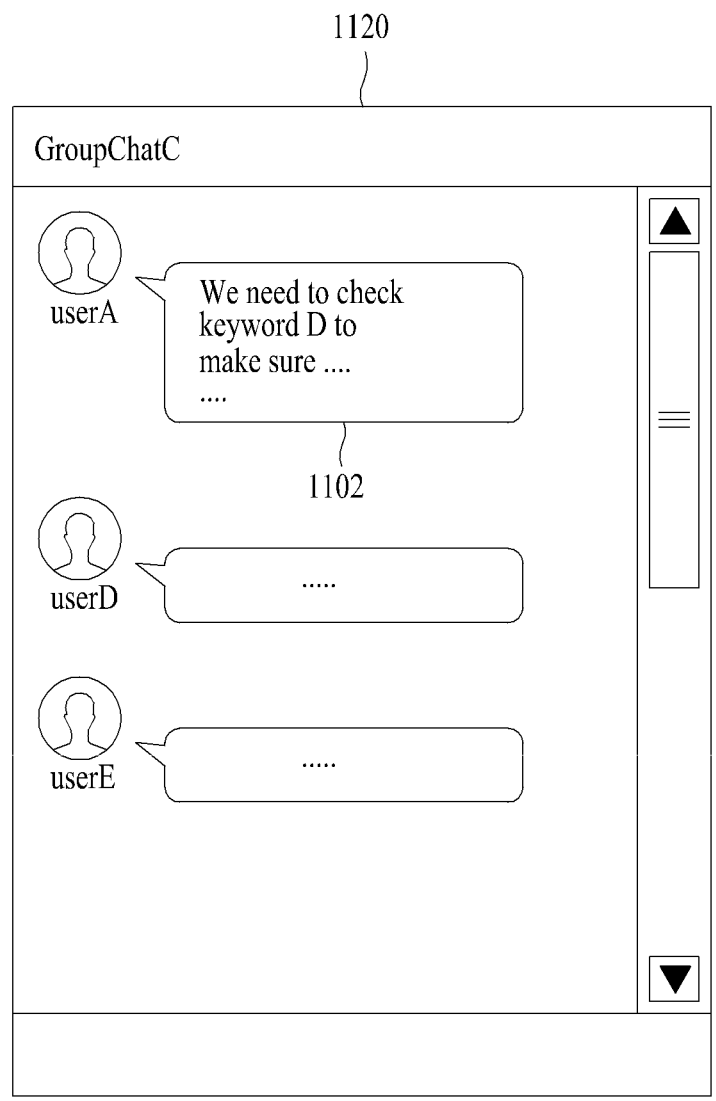
FIGS. 11 and 12 illustrate examples of describing a notification for a chat of interest of a user as a message-based notification according to at least one example embodiment.
Figure 12:
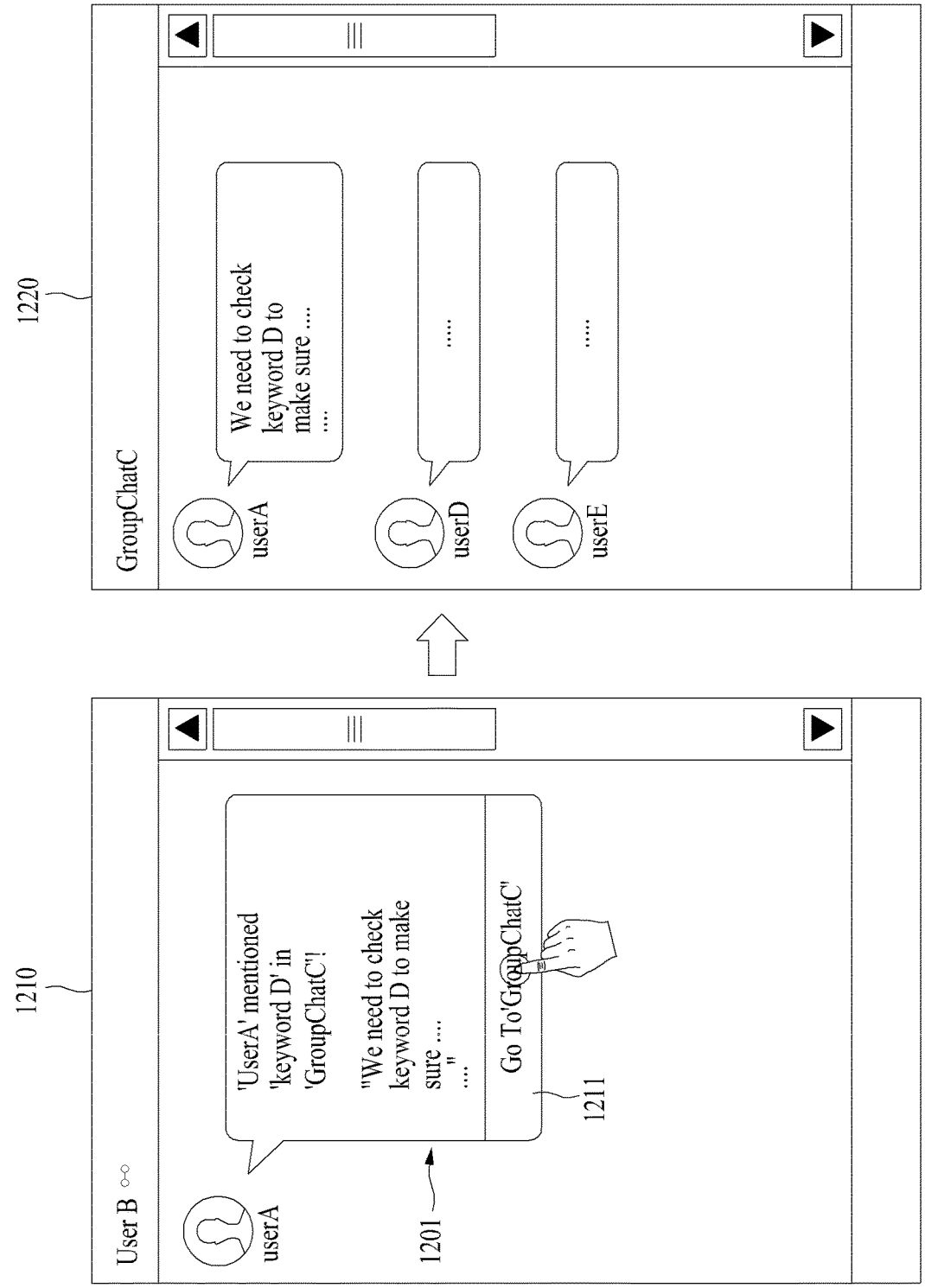

FIGS. 11 and 12 illustrate examples of describing a notification for a chat of interest of a user.

In response to an occurrence of a chat that includes a specific keyword to which an interest of the user is reflected during a conversation on a messenger, the server 150 may deliver a notification for the chat of interest of the user to a personal private chatroom of the corresponding user.

A keyword to which the interest of the user is reflected may inclusively indicate all the keywords that represent matters of interest of the user, for example, a keyword directly set on the messenger with a user intent to recognize in advance, a keyword related to a service object provided to the user through the messenger, for example, a keyword related to content the user subscribes to on the messenger, a keyword selected based on information associated with the user on the Internet, and the like.

For example, referring to FIG. 11, when it is assumed that a user B registers a keyword D with respect to an object that the user B desires to be preferentially notified of on the messenger, the server 150 identifies a message 1102 in which the keyword D is referred to in response to a user A transmitting the message 1102 in which the keyword D is mentioned during a conversation in a chatroom C 1120 in which the user B participates and delivers a notification message for a chat of interest of the user to a personal private chatroom of the user B.

Referring to FIG. 12, a notification message 1201 for a chat of interest of a user is displayed on a personal private chatroom 1210 of a user B and the notification message 1201 includes notification contents, for example, "'UserA' mentioned 'keyword D' in 'GroupChatC'!", and a connection link 1211 immediately redirectable to a chatroom in which the keyword D is mentioned.

The user B may verify contents of the notification message 1201 through the personal private chatroom 1210 without verifying an existing notification and may immediately redirect to a chatroom C 1220 in which the keyword D is mentioned through the connection link 1211 delivered with the notification message 1201 and may take a subsequent action, for example, an action of delivering a response message.

As described, a notification to which an importance is assigned may be distinguished from notifications on the messenger and may be delivered using a separate messenger interface, for example, a personal private chatroom of the user.

According to some example embodiments, it is possible to distinguishably notify items that are to be recognized by a user on a messenger on which various notifications occur. Here, a separate messenger interface not integrated with a notification center or a device push system within a service may be used as a method of delivering a notification based on a service characteristic of the messenger. Also, instead of simply delivering a notification regarding an item related to the user on the messenger, a path redirectable to the corresponding item is provided after verifying contents of the notification. Thus, the user may easily verify the corresponding item with a minimum number of motions and may immediately take a subsequent action. Accordingly, it is possible to enhance communication efficiency and convenience on the messenger through which a large number of notifications are delivered.

The apparatuses described herein may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tapes; optical media such as CD-ROM discs, and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A message-based notification method of a computer-implemented server, the method comprising:

setting, using at least one processor of the server, a main object associated with a user of an electronic device as a primary notification object among a plurality of notification objects on a messenger installed on the electronic device;

detecting, using the at least one processor, the primary notification object using a message transmitted or received through a conversation session set between an account of the user of the electronic device and an account of another user; and in response to detecting the primary notification object, generating, using the at least one processor, a notification message corresponding to the primary notification object, the generating the notification message including information on the conversation session in which the primary notification object is detected, and contents of the main object included in the conversation session in which the prima notification object is detected; and transmitting the notification message to the account of the user of the electronic device, wherein the setting of the primary notification object includes, setting, as the primary notification object, a keyword designating the user of the electronic device; and wherein the generating of the notification message includes, generating the notification message to include a link configured to cause the messenger to immediately redirect to a chatroom of the conversation session in which the primary notification object is detected, and information indicating that the user of the electronic device has been mentioned in the chatroom.

2. The method of claim 1, wherein the transmitting the notification message comprises:

transmitting the notification message through a conversation session that exclusively includes the account of the user of the electronic device for the primary notification object.

3. The method of claim 1, wherein the generating of the notification message comprises:

generating the notification message to include a link configured to cause the messenger to immediately redirect to a chatroom of the conversation session in which the primary notification object is detected.

4. The method of claim 1, wherein the setting of the primary notification object comprises:

setting, as at least one notification object of the plurality of notification objects, at least one of, a newly generated group chatroom, the newly generated chatroom including the user of the electronic device, a keyword in which an interest of the user of the electronic device is reflected, or any combinations thereof.

5. The method of claim 4, wherein the keyword designating the user of the electronic device is stored in the server, the keyword including at least one of a real name, an identifier (ID), or a nickname of the user of the electronic device; and the keyword is synchronized to the electronic device.

6. The method of claim 4, wherein the keyword in which the interest of the user of the electronic device is reflected comprises:

at least one of a keyword set to the messenger by the user of the electronic device, a keyword associated with a service object provided to the user of the electronic device through the messenger, or a keyword selected based on information associated with the user of the electronic device on the Internet.

7. The method of claim 1, wherein the detecting of the primary notification object comprises:

searching for a real-time conversation through the conversation session set between the account of the user of the electronic device and the account of the other user; and detecting, as the primary notification object, the keyword designating the user of the electronic device.

8. A message-based communication system of a computer-implemented server, the system comprising:

at least one processor configured to executable computer-readable instructions to, set a main object associated with a user of an electronic device as a primary notification object among a plurality of notification objects on a messenger installed on the electronic device, detect the primary notification object using a message transmitted or received through a conversation session set between an account of the user of the electronic device and an account of another user, generate a notification message that includes information on the conversation session in which the primary notification object is detected and contents of the main object included in the conversation session in which the primary notification object is detected, and transmit the notification message to the account of the user of the electronic device through a conversation session that exclusively includes the account of the user of the electronic device for the primary notification object, and wherein the setting of the primary notification object includes, setting, as the primary notification object, a keyword designating the user of the electronic device; and wherein the generating of the notification message includes, generating the notification message to include a link configured to cause the messenger to immediately redirect to a chatroom of the conversation session in which the primary notification object is detected, and information indicating that the user of the electronic device has been mentioned in the chatroom.

9. The system of claim 8, wherein the at least one processor is further caused to generate the notification message to include a link configured to cause the messenger to immediately redirect to a chatroom of the conversation session in which the primary notification object is detected.

10. The system of claim 8, wherein the at least one processor is further caused to set, as at least one notification object of the plurality of notification objects, at least one of, a newly generated group chatroom, the newly generated chatroom including the user of the electronic device, a keyword in which an interest of the user of the electronic device is reflected, or any combinations thereof.

11. The system of claim 8, wherein, to detect the primary notification object, the at least one processor is further caused to:

search for a real-time conversation through the conversation session set between the account of the user of the electronic device and the account of the other user; and detect the primary notification object.

12. A non-transitory computer-readable medium having computer readable instructions stored thereon, which when executed by at least one processor of an electronic device, causes the at least one processor to implement a message-based notification method, the method comprising:

setting a main object associated with a user of the electronic device among a plurality of notification objects as a primary notification object set on a messenger installed on the electronic device;

receiving a notification message for the primary notification object from a server associated with the messenger through a conversation session exclusively including an account of the user of the electronic device, the notification message including information on the conversation session in which the primary notification object is detected and contents of the main object included in the conversation session in which the primary notification object is detected; and displaying the notification message on a screen of the electronic device through a chatroom corresponding to the conversation session, and wherein the setting of the primary notification object includes, setting, as the primary notification object a keyword designating the user of the electronic device; and wherein the notification message includes, a link configured to cause the messenger to immediately redirect to a chatroom of the conversation session in which the primary notification object is detected, and information indicating that the user of the electronic device has been mentioned in the chatroom.

13. The non-transitory computer readable medium of claim 12, wherein the primary notification object is detected based on a message transmitted or received through a conversation session set between the account of the user of the electronic device and an account of another user.

14. The non-transitory computer readable medium of claim 13, wherein the at least one processor is further caused to:

set, as at least one notification object of the plurality of notification objects, at least one of:

a newly generated group chatroom, the newly generated chatroom including the user of the electronic device, a keyword in which an interest of the user of the electronic device is reflected, or any combinations thereof.

15. The non-transitory computer readable medium of claim 12, wherein the primary notification object is detected by, searching for a real-time conversation through a conversation session set between the account of the user of the electronic device and an account of another user; and the message-based notification method further comprises:

in response to receiving a selection on the notification message, providing a chatroom of the conversation session linked to the notification message.

* * * * *